No. 882,090. PATENTED MAR. 17, 1908.
W. H. ZELLERS.
LOOPER HOOK.
APPLICATION FILED NOV. 19, 1903.

WITNESSES:
W. H. Canby
H. Sample

INVENTOR
William H. Zellers
BY
A. V. Grout
ATTORNEY.

THE NORRIS PETERS CO., WASHINGTON, D. C.

UNITED STATES PATENT OFFICE.

WILLIAM H. ZELLERS, OF PHILADELPHIA, PENNSYLVANIA.

LOOPER-HOOK.

No. 882,090.　　　Specification of Letters Patent.　　　Patented March 17, 1908.

Application filed November 19, 1903. Serial No. 181,774.

*To all whom it may concern:*

Be it known that I, WILLIAM H. ZELLERS, a citizen of the United States, residing at Philadelphia, in the county of Philadelphia and State of Pennsylvania, have invented certain new and useful Improvements in Looper-Hooks, of which the following is a specification.

This invention relates to looper hooks for use in connection with sewing machines.

The object of the invention is to provide a simple durable and efficient construction whereby the looper hook may be detachably secured to its shank; to the end that, when the looper hook becomes worn or otherwise disabled, it may be readily removed from the shank and a new one substituted therefor, and thus obviate the otherwise necessity of discarding the hook and shank.

With this object in view the invention consists in the novel construction and combinations of parts which will be hereinafter fully described and claimed.

Figure 1:
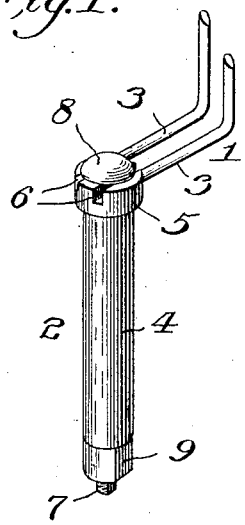
Figure 2:
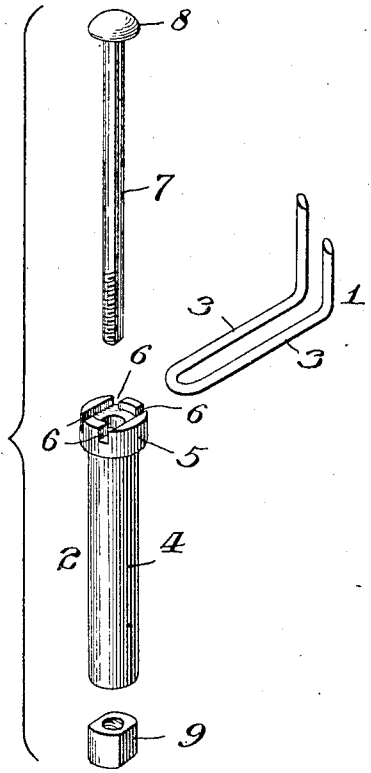
Figure 3:
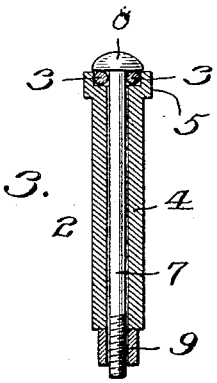

In the drawings—Figure 1 is a perspective view of my improved looper hook, slightly enlarged. Fig. 2 is a similar view, showing the parts detached. Fig. 3 is a vertical section through the looper hook.

1 designates the looper hook or thread engaging member, and 2 the shank therefor which is adapted to be applied to the hook actuating mechanism of any ordinary sewing machine requiring a looper hook, such, for example, as that illustrated in Letters Patent of the United States #692,017 dated January 28, 1902 to which reference may be had.

The hook proper, or thread engaging member, in the present instance, comprises a single piece of wire which is bent into substantially U-shaped form, thereby providing the substantially parallel sides of members 3, 3, the free ends of which are bent at right angles, as shown in the drawings. The hook may, however, be made of any desired shape to meet any of the various requirements.

The shank comprises the elongated body portion 4, provided at one end with a head 5 in which are formed transverse grooves 6 to which are fitted the parallel sides 3, 3, of the thread-engaging member 1, for the purpose of preventing lateral displacement of said member. Extending freely through the shank 2 and between the sides 3, 3, of the thread-engaging member 1 is a screw 7, the upper and lower ends of which are provided with heads 8 and 9, respectively. The lower head 9 is fitted to the threads on the lower end of the screw 7 and is adapted to engage the lower end of the shank. The upper head is made integral with the screw 7 and is adapted to engage the thread-engaging member 1, to the end that, when the head 9 is turned in one direction, the screw 7 may be drawn down through the shank 4 thereby causing the head 8 to securely clamp the thread-engaging member to the shank. When the head 9 is turned in the reverse direction, the screw 7 may be raised to disengage the head 8 from the member 1 thereby permitting the removal of the member from the shank. The transverse grooves 6 serve to prevent the member 1 from turning about the axis of the screw 7 and thus maintain the member 1 in a fixed position relative to the shank.

It will be observed that the sides of the screw 7 are flattened for engagement with the sides 3, 3, of the member 1 for the purpose of preventing rotation of the screw while turning the head 9.

I desire it to be understood that I do not limit myself to the particular constructions herein shown and described as the same may be modified without departing from the invention.

I claim—

1. A looper hook comprising a shank, a thread engaging member extending at right angles thereto, and having side members provided with bent ends, and a screw extending between said side members and into said shank, and provided with a head to engage said members to detachably secure the thread engaging member to the shank.

2. A looper hook comprising a shank having a transverse groove in one end thereof, a thread engaging member extending at right angles to the shank and fitted to the groove therein, and a screw extending through said member and provided with a head to engage said member to detachably secure it to the shank.

3. A looper hook comprising a shank, a thread-engaging member extending at right angles thereto, a screw to detachably clamp said shank and member together, means on the shank to engage said member and prevent it from turning about the axis of the shank before the screw is moved into clamping position, and means on the shank to engage said member and prevent it from moving in a direction at right angles to the shank before the screw is moved into clamping position.

4. A looper hook comprising a shank provided with a depression in one end thereof, a thread-engaging member arranged within the depression and extending at right angles to the shank, the walls of said depression being adapted to engage said member to prevent it from moving in one direction at right angles to the shank and to prevent it from turning about the axis of the shank, and means to detachably secure the member to the shank.

5. A looper hook comprising an elongated shank having an axial opening therein, a thread-engaging member extending from one end thereof and at substantially right angles thereto, and a screw extending through said opening and provided with an integral head and an adjustable clamping head one of which is adapted to engage said member and the other of which is adapted to engage said shank, whereby said shank and member are detachably secured together.

6. A looper hook comprising an elongated shank having an axial opening therein and a transverse groove in one end thereof, a thread-engaging member fitted to said groove, and a screw extending through said opening and provided with an integral head and an adjustable clamping head one of which is adapted to engage said member and the other of which is adapted to engage said shank whereby said member and shank are detachably secured together.

7. A looper hook comprising an elongated shank having an axial opening therein a thread-engaging member extending from one end thereof and at substantially right angles thereto, said member having substantially parallel sides with an opening therebetween, and a screw extending through said openings and provided with flattened sides adapted to engage the sides of said member, said screw being provided with an integral head and an adjustable clamping head one of which is adapted to engage said member and the other of which is adapted to engage said shank whereby said member and shank are detachably held together.

In testimony whereof I affix my signature in presence of two witnesses.

WILLIAM H. ZELLERS.

Witnesses:
ANDREW V. GROUPE,
RALPH H. GAMBLE